(12) United States Patent
Borgen et al.

(10) Patent No.: US 8,149,647 B2
(45) Date of Patent: Apr. 3, 2012

(54) SEISMIC CABLE AND ACOUSTICALLY DECOUPLED SENSOR

(75) Inventors: Lars Borgen, Oslo (NO); Geir Holm, Slependen (NO); Ivar Andreas Valstad, Stabekk (NO); Kambiz Iranpour, Oslo (NI)

(73) Assignee: WesternGeco L.L.C., Houston, TX (US)

( * ) Notice: Subject to any disclaimer, the term of this patent is extended or adjusted under 35 U.S.C. 154(b) by 777 days.

(21) Appl. No.: 11/560,736

(22) Filed: Nov. 16, 2006

(65) Prior Publication Data

US 2008/0117717 A1 May 22, 2008

(51) Int. Cl.
*G01V 1/38* (2006.01)

(52) U.S. Cl. ............................................. 367/20; 367/15

(58) Field of Classification Search ............... 367/15, 367/18, 19, 20, 188
See application file for complete search history.

(56) References Cited

U.S. PATENT DOCUMENTS

| | | | | |
|---|---|---|---|---|
| 4,300,218 | A * | 11/1981 | Kruka et al. | 367/165 |
| 5,265,066 | A | 11/1993 | Svenning et al. | |
| 5,745,436 | A * | 4/1998 | Bittleston | 367/20 |
| 5,747,754 | A | 5/1998 | Svenning et al. | |
| 6,061,302 | A * | 5/2000 | Brink et al. | 367/188 |
| 6,278,823 | B1 * | 8/2001 | Goldner et al. | 385/100 |
| 6,288,972 | B1 | 9/2001 | Norris | |
| 6,381,397 | B1 * | 4/2002 | Bevan et al. | 385/139 |
| 6,473,365 | B2 * | 10/2002 | Joh et al. | 367/154 |
| 6,519,395 | B1 * | 2/2003 | Bevan et al. | 385/100 |
| 6,657,921 | B1 | 12/2003 | Ambs | |
| 6,775,203 | B2 | 8/2004 | Fageras et al. | |
| 7,376,045 | B2 * | 5/2008 | Falkenberg et al. | 367/19 |
| 2004/0013036 | A1 | 1/2004 | Fageras et al. | |
| 2004/0068373 | A1 | 4/2004 | Goujon et al. | |
| 2005/0146987 | A1 * | 7/2005 | Goujon et al. | 367/188 |
| 2005/0194201 | A1 * | 9/2005 | Tenghamn et al. | 181/112 |
| 2006/0117874 | A1 | 6/2006 | Goujon et al. | |
| 2006/0227656 | A1 * | 10/2006 | Berg et al. | 367/15 |
| 2007/0091719 | A1 * | 4/2007 | Falkenberg et al. | 367/19 |
| 2007/0266804 | A1 * | 11/2007 | Goujon et al. | 73/866.5 |

FOREIGN PATENT DOCUMENTS

| | | |
|---|---|---|
| DE | 3809349 A | 10/1989 |
| WF | WO 02/14905 A1 | 2/2002 |
| WO | WO 2004/046682 | 6/2004 |
| WO | WO2004/079398 | 9/2004 |

OTHER PUBLICATIONS

UK Patent office search report on British Patent Application No. 0722494.2, dated Feb. 29, 2008.

* cited by examiner

*Primary Examiner* — Jack W Keith
*Assistant Examiner* — Krystine Breier

(57) ABSTRACT

A robust seismic cable and sensor module system wherein the sensor modules include a housing and sensing unit. The housing substantially transfers the load and torque of the cable from one end of the housing to the other bypassing the sensing unit and the sensing unit and housing are acoustically decoupled from each other for the seismic frequencies desired.

18 Claims, 4 Drawing Sheets

SEISMIC CABLE AND ACOUSTICALLY DECOUPLED SENSOR

FIELD OF THE INVENTION

The present invention relates in general to seismic cable systems and more particularly to a reliable and robust seismic cable system having sensor units that are substantially acoustically decoupled from the mechanically connected cable.

BACKGROUND

A seismic cable will generally have sensor modules distributed along its length. Inside the sensor module is one or more sensors. Examples of sensors are geophones, accelerometers, hydrophones, tilt meters, magnetometers. The sensors can include electronics conditioning the signal and/or digitizing it. The sensors can be connected by leads, transmitting the sensor data through the seismic cable to electronics modules located along the cable or between cable sections, or can be connected by a data bus.

The seismic sensors are intended to be disposed, in use, on the earth's surface. The term "earth's surface" as used herein includes the sea-bed, land, and the transition zone. When the sensor is disposed on the earth's surface, the coupling of the seismic sensing element(s) to the earth is commonly provided in the prior art by a housing of the sensor; the housing also provides physical protection for the sensing element(s). In the case of sea-bed seismic data acquisition, the cable is then lowered onto the sea-bed to deploy the sensors at their desired locations on the sea-bed.

Seabed or ocean bottom cable systems generally are designed to meet two conflicting goals. First, the cable system must be robust and resistant to damage. For example, the cable system must survive and operate at great water depth. Also, the cable system may be roughly handled during deployment and retrieval. Second, the cable system should be sensitive to acoustic vibrations and not compromise the quality of data recorded by the sensor units. To design and construct a robust but sensitive cable requires balancing robustness and sensitivity through a large number of tradeoffs.

Sea-bed seismic sensors generally record the pressure and the elastic wavefield of the seismic data. The pressure is a scalar quantity, whereas the elastic wavefield is a vector quantity and it is therefore necessary to measure the components of the elastic wavefield in three non-coplanar directions. The three directions chosen are usually the x-direction (defined as being parallel to the cable, and also known as the "in-line" direction), the y-direction (defined as being perpendicular to the cable, and also known as the "cross-line" direction), and the z-direction (vertical). In total, therefore, four components of the seismic data are measured. Four-component seismic data recording at the sea-bed has proven to be a very successful method for imaging through gas saturated overburdens and for characterizing hydrocarbon reservoirs through lithology identification and fluid discrimination. The 3-component data for the elastic wavefield are especially useful, since they enable the separation of the P-waves from the shear S-waves.

Reliable interpretation of the elastic wavefield is possible only if the three components of the wavefield are recorded accurately. Seafloor multi-component recording systems available to the market today have problems meeting this objective. The principal problem that arises is that robust cables are stiff and acoustically couple too well to the sensor unit, thus limiting pick up from the seabed below the sensor unit. As a result it is commonly necessary to sacrifice either robust cable construction or high quality seismic recording.

It is thus a desire to provide a seismic cable systems that addresses drawbacks of the prior art systems. It is a further desire to provide a seismic cable system that provides a robust cable construction and high quality seismic recording. It is a still further desire to provide a sensor that is substantially acoustically decoupled from a mechanically coupled, robust, cable.

SUMMARY OF THE INVENTION

In view of the foregoing and other considerations, the present invention relates to seismic surveys and in particular to a robust seismic cable having sensors that are substantially decoupled acoustically from the cable.

Accordingly, an embodiment of a seismic cable includes a perforated housing have in a first end and a second end, the ends fixedly connected to the cable and a sensor unit including a sensor disposed with the interior of the housing physically connected to an acoustic connector positioned exterior of the housing.

In another embodiment, the seismic cable includes a perforated housing have in a first end and a second end, the ends fixedly connected to the cable, a sensor unit and a mechanism for suspending the sensing unit relative to the housing that dampen the transfer of vibrations from the housing to the sensor unit.

In another embodiment, a sensor module includes a housing having a first end connected to the cable at a first termination and a second end connected to the cable at a second termination wherein the load and torque of the cable is transferred from the first end to the second end, a sensor unit including a sensor disposed in the interior of the housing and an acoustic connector positioned exterior of the housing across an aperture formed through the housing, the sensor unit being substantially acoustically decoupled from the housing, and a water seal between the exterior of the housing and the interior of the housing connected between the terminations and the sensor unit.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1:
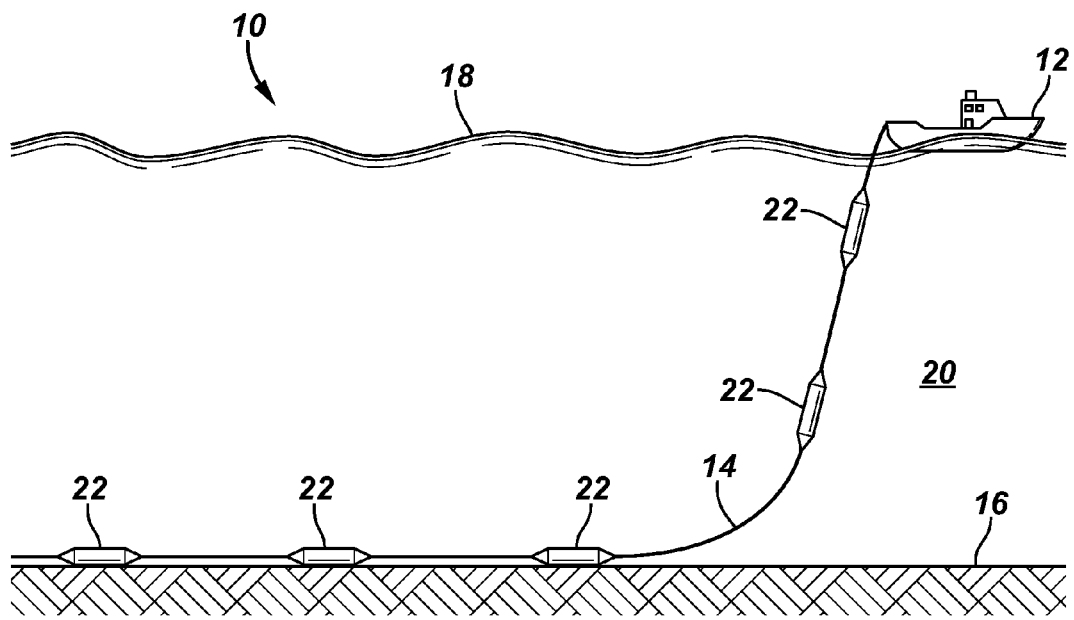
FIG. 1 illustrates a seismic survey vessel from which a seismic cable with sensors that are substantially acoustically decoupled from the cable, in accordance with an embodiment of the present invention, is deployed.

Refer now to the drawings wherein depicted elements are not necessarily shown to scale and wherein like or similar elements are designated by the same reference numeral through the several views.

FIG. 1 is an illustration of the deployment of an embodiment of a survey system 10 of the present invention. Seismic survey vessel 12 has deployed a seismic cable 14 to the bed 16 from the surface 18 of a body of water 20. In the illustrated embodiment, the body of water 20 is part of an ocean. Consequently, bed 16 is a seabed, or ocean bottom. However, the invention is not so limited, as the invention may be used for surveys conducted in fresh and brackish water. Additionally, the system may be utilized in land surveys.

Seismic cable 14 includes a plurality of sensor modules 22. The number and distribution of sensor modules 22 on cable 14 is not material to the practice of the invention. These factors are largely implementation specific, driven by the design of the survey to be conducted. Note also that more than one seismic cable 14 will normally be deployed to conduct a survey. In such embodiments, the seismic cables may be deployed in configured arrays.

Figure 2:
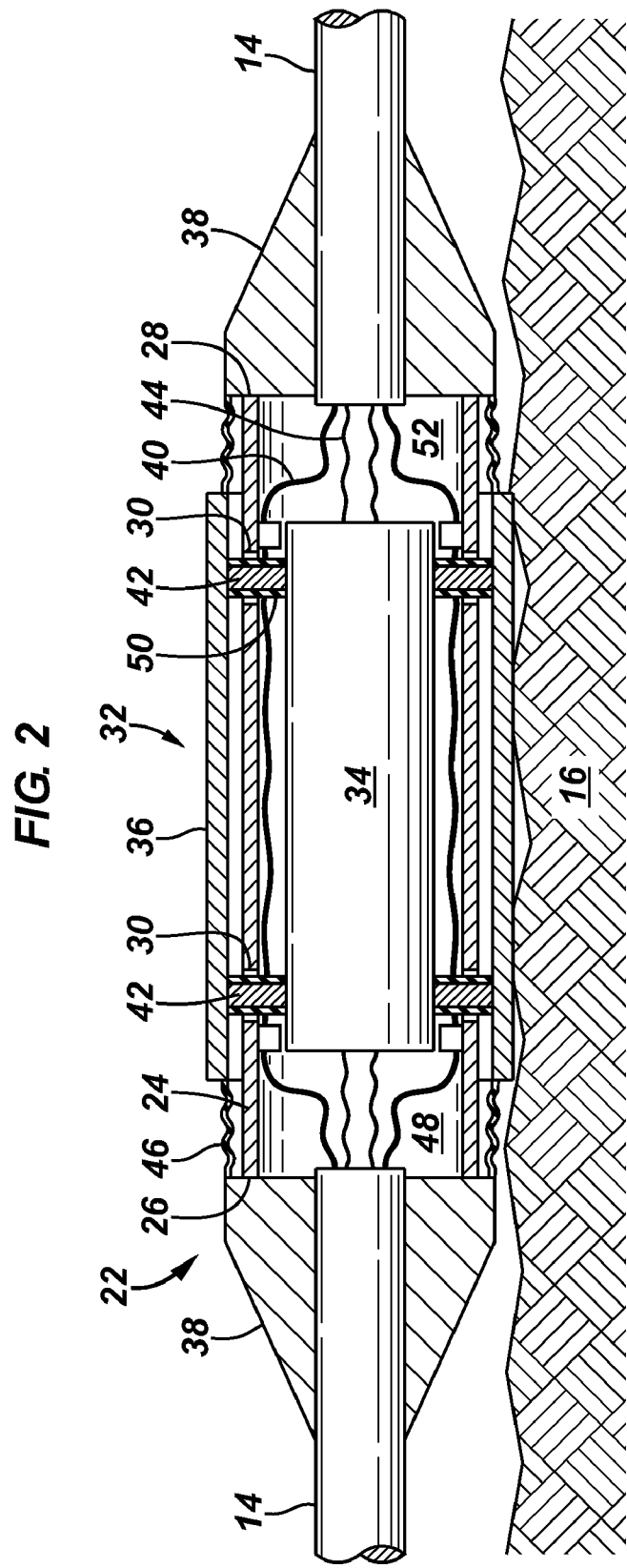
FIG. 2 is a cross-sectional view of an embodiment of a sensor module of the present invention.

Refer now to FIG. 2, wherein an embodiment of a sensor module 22 is illustrated in cross-section. Sensor module 22 includes a load carrying housing 24 and a sensor unit 32. Sensor unit 32 includes one or more sensors 34 and an acoustic connector 36. Examples of sensors are geophones, accelerometers, hydrophones, tilt meters and magnetometers. Note that for purposes of description, sensor 34 will generally be referred to in the singular, although embodiments may include one or more sensors.

Cables 14 are mechanically connected to housing 24 and transfer the torque and tension in the cable from one end of housing 24 to the other end bypassing sensor unit 32 and in particular sensors 34. Sensor 34 is suspended in housing 24, for example by being loosely fixed to housing 24 by a vibration dampening material or being completely free from connection with housing 24. Sensor 34 is physically connected to an acoustic connector 36, positioned exterior of housing 24, to provide acoustical connection with the earth's surface. Thus, cable 14, terminations 38 and housing 24 are load carrying structures and sensor unit 32 is the seismic sensing structure. The load carrying structure and the seismic sensing structures are acoustically decoupled from each other for the seismic frequencies desired to record. Sensor unit 32 is therefore able to follow the seabed accelerations and vibrations independent of cable 14 stiffness and residual torque and tension in cable 14 from deployment to the seabed. As such, sensor unit is substantially acoustically decoupled from cable 14.

Housing 24 has a first end 26 and a second end 28 and is perforated, forming one or more apertures 30. Each end 26, 28 is mechanically terminated with cable 14 at terminations 38. Housing 24 is illustrated as tubular in FIGS. 1 and 2, however, it should be recognized that housing 24 may be constructed in various shapes and fashions such as without limitation, cage structures, frame works and tubes with windows. Some of the various constructions and geometries for housing 24 are illustrated in the various drawings. The transmission bundle 40, typically optical fiber and power wires, may extend through cables 14 and housing 34 and bypass sensor 34.

Sensor 34 is disposed within housing 24 and acoustic connector 36 is positioned exterior of housing 24 so as to acoustically connect sensor 34 to seabed 16. Sensor 34 is connected to acoustic connector 36 by connectors 42 which pass through perforation or aperture 30 to form sensor unit 32. Connector 42 provides a rigid connection between sensor 24 and acoustic connector 36. It should be recognized that connector 42 may be a unitary portion of sensor unit 32 in some embodiments of the invention. Sensor network wires 44 are connected to sensor 34.

In the embodiment illustrated in FIGS. 1 and 2, a sealing and/or resilient member 46 is shown connected between termination 38 and acoustic connector 36. Member 46 may be constructed of a flexible, resilient material to provide a biasing force to centralize and/or suspend sensor 34 relative to housing 24, and generally centralize sensor unit 32 when sensor module 22 lands on seabed 16. Damper member 46 is desirably constructed of a vibration dampening material and/or in a manner to limit transfer of vibrations from cable 14 to sensor 34. Additionally, resilient member 46 may provide a seal between water 20 (FIG. 1) and the interior 48 of housing 24.

Other vibration dampening centralizing or suspension elements may utilized in place of or in addition to resilient element 46. For example, suspension members 50 is shown positioned between housing 24 at perforations 30 and sensor unit 32. Suspension members 50 may comprise without limitation compressible materials, springs or other materials and/or constructions that have vibration dampening characteristics. For example, suspension members 50 may comprise active or passive magnetic springs between housing 24 and sensor unit 32. Note that suspension members 50 may be positioned in one or more locations between sensor unit 32 and housing 24 in addition to those positions illustrated (examples are provided in FIGS. 5 and 6). Desirably the selected suspension members 50 and/or 46 have a known spring coefficient.

It is desired in some embodiments, that interior 48 of housing 24 that is not occupied by physical structures be filled with a filler medium 52, such as a pressure compensated fluid or gel. Filler medium 52 provides some of the vibration dampening properties of the present system. For example, sensor 34, such as a hydrophone, is positioned inside of housing 24 and the pressure waves propagate through sealing member 46 and into filler medium 52. Frequency response for the shear waves can be optimized by the spring coefficients and damper properties properties. The size and layout of perforations 30 and the viscosity of filler medium 52 partly define the dampening properties of sensor module 22.

Transmission bundle 40 and sensor network wires 44 may be constructed as water proof, consequently eliminating the need to seal between housing 24 and sensor 34. In this embodiment, sensor module 22 would be flooded with sea water 20 (FIG. 1). Thus, the surrounding medium (sea water 20) would serve to suspend sensor 34 relative to housing 24 and provide vibration dampening.

Figure 3:
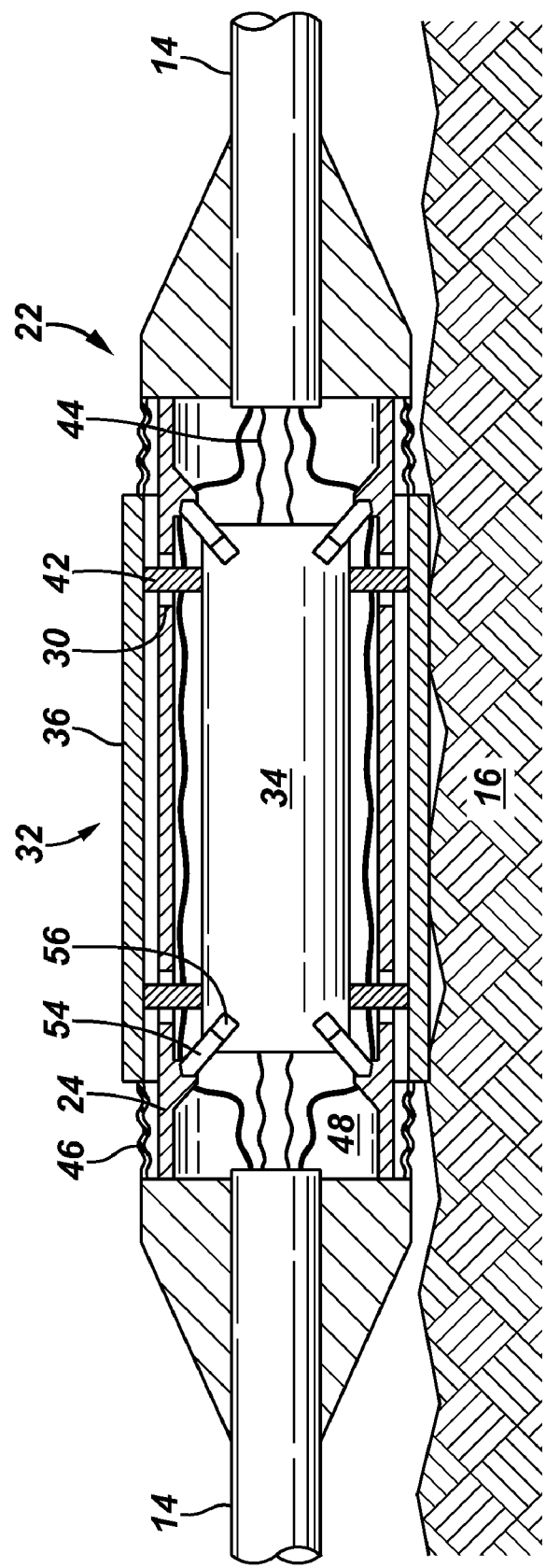
FIG. 3 is a cross-sectional view of another embodiment of a sensor module of the present invention.

Referring now to FIG. 3, a cross-sectional view of another embodiment of sensor module 22 of the present invention is illustrated. In this embodiment, the vibration dampening suspension member 50 of FIG. 2, connecting sensor unit 32 to housing 24, is eliminated. To ensure that sensor unit 32 is not displaced to the maximum of its free-play during deployment dragging and handling, a locking mechanism 54 is provided between housing 24 and sensor unit 32. Locking mechanisms 54 are shown in the engaged or locked position between sensor 34 and housing 24 in FIG. 3. Locking mechanism 52 facilitates positioning sensor 34 close to the center of the free stroke when the seismic recording starts.

During deployment or retrieval of cable 14, locking mechanism 54 is engaged so that sensor unit 32 is physically connected to and stabilized by housing 24. When cable 14 is deployed and sensor deployed to seabed 16, locking mechanisms 54 are disengaged. Driving mechanisms 56 for operating locking mechanism 54 between the engaged and disengaged positions include without limitation electric and magnetic motors that may be operated by the sensor 34 electronics.

Figure 4:
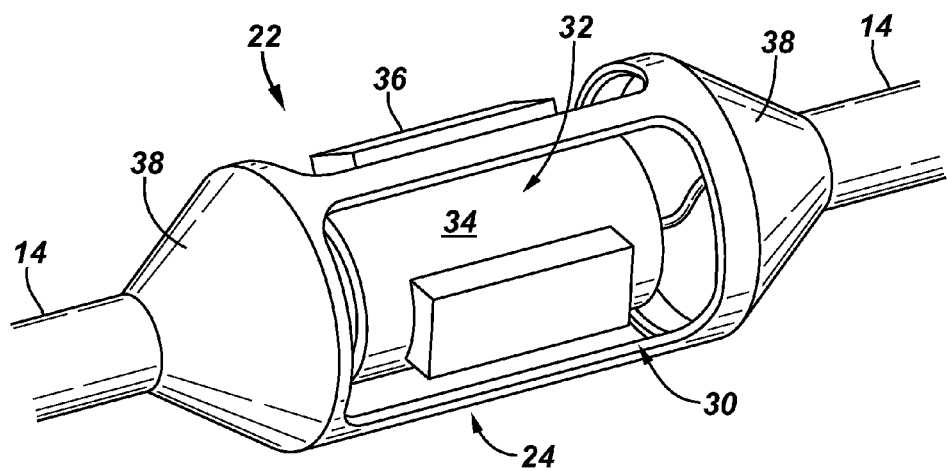
FIG. 4 is a perspective view of an embodiment of a sensor module of the present invention.

Referring now to FIG. 4, a perspective view of an embodiment of a sensor module 22 of the present invention is illustrated. Housing 24 is constructed in a cage fashion having window shaped apertures 30. Sensor unit 32 is a unitary construction, wherein acoustic connectors 36 project outward from sensor 34 so as to extend through aperture 30 to the exterior of housing 24.

Figure 5:
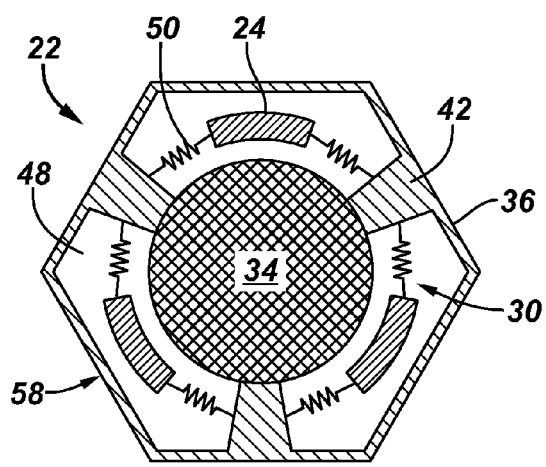
FIG. 5 is an end view of an embodiment of the sensor module of the present invention illustrating an example of a suspension mechanism and module geometry.
Figure 6:
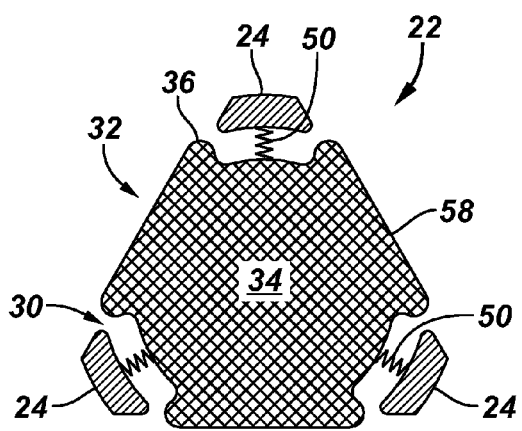
FIG. 6 is an end view of an embodiment of the sensor module of the present invention illustrating another example of a suspension mechanism and module geometry.

Refer now to FIGS. 5 and 6 wherein examples of sensor module 22 geometries and vibration dampening suspension mechanisms 50 are illustrated. In FIG. 5, sensor module 22 is hexagonal shaped. In particular, acoustic connector 36 is hexagonal forming six surfaces 58 that ensure a quality acoustical connection with the seabed. Sensor 34 is positioned proximate the center of housing 24 and is structurally connected to acoustic connector 36 via connectors 42 that pass through apertures 30 of housing 24. Sensor 34 is suspended and substantially centered in interior 48 suspension members 50. Suspension members 50 are connected between housing 24 and connectors 42 of sensor unit 32 in apertures 30.

FIG. 6 illustrates a triangular shaped sensor module 22 having three acoustic surfaces 58 to ensure a quality acoustic connection with the seabed. In this embodiment, sensor unit 32 is a unitary construction wherein the acoustic connectors 36 project outwardly from sensor body to extend through apertures 30 of housing 24.

Suspension member 50 is illustrated as a mechanical spring in FIGS. 5 and 6. However, again it should be noted that suspension member 50 may be constructed in other manners such as, but not limited to, compressible materials, active or passive magnetic springs or other materials, structures or mechanism that will suspend and centralize sensor 34 relative to housing 24 proving dampening characteristics to maintain sensor unit 32 substantially acoustically decoupled from cable 14.

From the foregoing detailed description of specific embodiments of the invention, it should be apparent that a system for acoustically decoupling a seismic sensor from its rigid and robust cable that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A seismic cable having seismic sensors that are substantially acoustically decoupled from the cable, the cable comprising:
    a seismic cable;
    a perforated housing having a first end and a second end, the ends fixedly connected to the cable; and
    a sensor unit including a sensor rigidly connected to an acoustic connector, the sensor disposed within an interior of the housing and the acoustic connector extending through an aperture to the exterior of the housing to acoustically couple the sensor to the earth's surface, whereby the sensor is substantially acoustically decoupled from the earth's surface through the cable irrespective of whether the cable is in tension.

2. The cable of claim 1, wherein the sensor unit is a unitary construction.

3. The cable of claim 1, wherein the interior of the housing includes a pressure compensated filler medium.

4. The cable of claim 1, further including a locking mechanism in connection between the sensor and the housing, the locking mechanism operable between an engaged position holding the sensor unit in a substantially fixed position relative to the housing and a disengaged position wherein the sensor is moveable relative to the housing.

5. The cable of claim 4, wherein the sensor is rigidly connected to the acoustic connector by a connector passing through an aperture formed through the housing.

6. The cable of claim 4, wherein the sensor unit is a unitary construction.

7. The cable of claim 4, wherein the interior of the housing includes a pressure compensated filler medium.

8. The cable of claim 5, wherein the interior of the housing includes a pressure compensated filler medium.

9. A seismic cable having seismic sensors that are substantially acoustically decoupled from the cable, the cable comprising:
    a perforated housing having a first end and a second end, the ends fixedly connected to the cable to transfer tension in the cable from one end of the housing to the other;
    a sensor unit positioned in the interior of the of the housing;
    an acoustic connector rigidly connected to the sensor unit, the acoustic connector projecting outward from the sensor unit and extending through an aperture to the exterior of the housing; and
    means for suspending the sensor unit relative to the housing to dampen the transfer of vibrations from the housing to the sensor unit, whereby the sensor unit is substantially acoustically decoupled from the earth through the housing and the sensor unit is substantially decoupled from the earth through the cable irrespective of whether the cable is in tension.

10. The cable of claim 9, wherein the suspending means includes a spring connected between the sensor unit and the housing.

11. The cable of claim 9, wherein the suspending means includes a pressurized filler medium.

12. The cable of claim 9, further including a means for sealing an interior of the housing from water exterior of the housing.

13. A seismic cable having sensor modules, the sensor module comprising:
    a housing having a first end connected to the cable at a first termination and a second end connected to the cable at a second termination wherein the load and torque of the cable is transferred from the first end to the second end;
    a sensor unit including a sensor rigidly connected to an acoustic connector, the sensor disposed in an interior of the housing and the acoustic connector extending through an aperture to the exterior of the housing to acoustically couple the sensor to the earth, whereby the sensor unit is substantially acoustically decoupled from the earth through the housing.

14. The sensor module of claim 13, further including a means for positioning the sensor unit relative to the housing connected between the housing and the sensor unit.

15. The sensor module of claim 13, further including a pressure compensated fluid in the interior of the housing.

16. The sensor module of claim 14, further including a pressure compensated fluid in the interior of the housing.

17. The sensor module of claim 14, further including a locking mechanism in connection between the sensor and the housing, the locking mechanism operable between an engaged position holding the sensor unit in a substantially fixed position relative to the housing and a disengaged position wherein the sensor is moveable relative to the housing.

18. The sensor module of claim 17, further including a pressure compensated fluid in the interior of the housing.

* * * * *